Jan. 26, 1926.
P. O. BROWN
1,570,873
EMERGENCY GREASE CUP
Filed May 14, 1925.
Fig. 1.
Fig. 2.
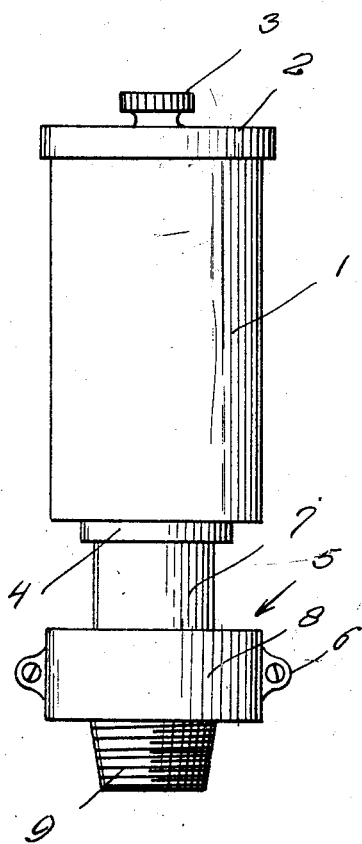
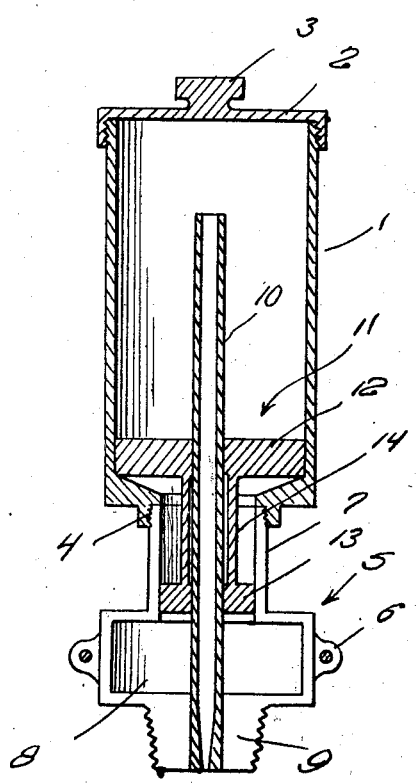
Inventor
Perry O. Brown,
By Clarence A. O'Brien
Attorney Patented Jan. 26, 1926.

1,570,873

UNITED STATES PATENT OFFICE.

PERRY O. BROWN, OF ST. VINCENT, MINNESOTA, ASSIGNOR OF ONE-HALF TO GUSTAF V. BACKSTROM, OF ST. VINCENT, MINNESOTA.

EMERGENCY GREASE CUP.

Application filed May 14, 1925. Serial No. 30,318.

*To all whom it may concern:*

Be it known that I, PERRY O. BROWN, a citizen of the United States, residing at St. Vincent, in the county of Kittson and State of Minnesota, have invented certain new and useful Improvements in an Emergency Grease Cup, of which the following is a specification.

This invention relates to an improved lubricating device which may be briefly referred to as an emergency grease cup.

The purpose of the invention is to prevent the overheating of boxings, bearings, and pinions by supplying a lubricant thereto when the friction produced by the dry bearing creates a heat sufficient to cause automatic operation of the device.

More particularly, I propose a grease cup which embodies a mercury receptacle having a plug adapted to be tapped into a screw hole in the bearing or the like, the mercury being expanded under undue frictional heat created to act upon a sliding plunger in a grease containing cup, whereby to force the grease through an appropriate conduit to the part to be oiled.

An object is to generally improve upon devices of this class by providing one of comparative simplicity and durability which is composed of a plurality of readily disconnectible parts capable of being readily disassembled or assembled for repairs and cleaning.

The novelty resides in the particular construction of the details and their novel association and arrangement.

Other features and advantages of the invention will become apparent from the following description and drawing.

In the accompanying drawing forming a part of this application and in which like numerals are employed to designate like parts throughout the same:

Figure 1 is a side elevational view of a lubricating device constructed in accordance with the present invention.

Figure 2 is a central vertical section through the same.

Referring to the drawings in detail, the reference character 1 designates what may be designated as a grease or oil containing cup. This is open at its top and provided at this end with external screw threads. A removable cover 2 is equipped with a flange screwed onto the threads and serving to close the upper end of the cup. The cover is preferably provided with a knurled finger piece 3 by means of which its removal and application is facilitated. The cup is provided at its bottom with an opening surrounded by a depending internally screw threaded flange 4 which serves a purpose to be hereinafter described.

Detachably connected to the flange is a hollow base, indicated generally by the reference character 5. This base is preferably made up of symmetrical half sections equipped with ears 6, by means of which the two sections are bolted together. The sectional base embodies a reduced neck 7 having a threaded upper end screwed into the flange 4. Below this neck is an enlarged portion forming a mercury containing receptacle 8. Attached to the bottom of this receptacle is an externally screw threaded plug 9 adapted to be tapped into a screw hole in the bearing box, gear casing, or the like. This plug 9 is formed with a central opening, and the lower end of an oil conducting pipe 10 is fitted into the same. When the base is attached to the cup, the upper end of the pipe extends into the interior of the latter and terminates at a point adjacent the closure 2. A plunger 11 is associated with the device for the purpose of ejecting the lubricant. The plunger comprises a relatively large discular head 12 slidable in the cup, and a lower head 13 slidable in the neck 7, these two heads being connected together by a sleeve or the like 14. In practice, appropriate packing must be provided to insure fluid tight joints.

In assembling the device, the cover 2 must be removed to permit the plunger to be inserted from the top of the cup and slid down over the tube 10 which has been previously inserted by attaching the hollow base 5 to the bottom flange of the cup.

As before stated, when the device is tapped into the journal box, or its equivalent, and the bearing runs dry, it is obvious that the frictional heat produced will serve to heat the device to a degree to cause the mercury in the chamber 8 to expand and to exert an upward thrust upon the plunger. The upward movement of the plunger will serve to eject the lubricant from the cup by forcing it downwardly through the tube 10 and into the needy part with which the device is associated.

It is thought that by carefully considering the description in connection with the drawings, persons familiar with devices of this class will be able to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. In a lubricating device of the class described, a cup, a lubricant conducting tube extending into the cup and adapted to conduct the lubricant therefrom to the part to be lubricated, a plunger slidable in said cup for forcing the lubricant into said tube, and a mercury receptacle carried by the bottom of the cup slidably receiving a portion of said plunger, whereby to permit the expansion of the mercury to act upon said portion and to cause the plunger to eject the lubricant.

2. In a lubricating device of the class described, a lubricant container, a hollow base connected to the bottom of the container, a portion of said base being fashioned to provide a mercury receptacle, a lubricant conducting tube carried by said base and having its inner end projecting into the interior of said container, and a plunger piston slidable upon said tube and having a portion extending slidably into said container, said plunger being actuated by the expansion of mercury adapted to be placed in the aforesaid receptacle.

3. In a lubricating device of the class described, a lubricant containing cup, open at its top and provided in its bottom with an opening and a depending internally screw threaded flange, a removable screw cover for the open top, a hollow base embodying a neck having screw threaded connection with said flange, and an enlarged portion forming a mercury containing chamber, together with a screw threaded plug, a conducting pipe connected with said plug and extending through said chamber, neck, and into the interior of said cup, and a plunger slidably mounted upon said tube and having portions slidable in said neck and cup.

4. In a lubricating device of the class described, a lubricant containing cup, a lubricant ejecting plunger slidable in said cup, a portion of said plunger extending through a part of the cup to the exterior thereof, and heat controlled means cooperable with the exteriorly disposed portion of said plunger for actuating the latter, said means being adapted to be located in close proximity to the bearing to be lubricated and being constructed to accommodate a quantity of mercury adapted to be expanded by the heat and to actuate said plunger.

In testimony whereof I affix my signature.

PERRY O. BROWN.